United States Patent [19]

Deloddere et al.

[11] Patent Number: 5,434,984
[45] Date of Patent: Jul. 18, 1995

[54] PRIORITY BASED ACCESS CONTROL ARRANGEMENT

[75] Inventors: Chris F. P. Deloddere, Knokke-Heist; Jan L. B. De Groote, Schilde, both of Belgium

[73] Assignee: Alcatel N.V., Amsterdam, Netherlands

[21] Appl. No.: 36,136

[22] Filed: Mar. 24, 1993

[30] Foreign Application Priority Data

Mar. 27, 1992 [EP] European Pat. Off. ............ 92870049

[51] Int. Cl.⁶ .................... G06F 13/14; G06F 13/36; G06F 13/368
[52] U.S. Cl. ................... 395/325; 370/85.6; 340/825.5; 364/242.6; 364/242.92; 364/242.7; 364/242.8; 364/241.9; 364/271.5; 364/DIG. 1
[58] Field of Search ............... 395/325, 725, 275, 425; 340/825.5, 825.51; 370/85.2, 85.6

[56] References Cited

U.S. PATENT DOCUMENTS

| | | | |
|---|---|---|---|
| 4,059,851 | 11/1977 | Nutter, Jr. et al. | 395/275 |
| 4,148,011 | 4/1979 | McLagan et al. | 340/825.5 |
| 4,209,838 | 6/1980 | Alcorn, Jr. et al. | 395/325 |
| 4,592,049 | 5/1986 | Killat et al. | 370/85.6 |
| 4,620,278 | 10/1986 | Ellsworth et al. | 395/325 |
| 4,641,266 | 2/1987 | Walsh | 395/325 |
| 4,745,548 | 5/1988 | Blahut | 395/325 |
| 4,827,471 | 5/1989 | Geiger et al. | 370/85.1 |
| 4,920,486 | 4/1990 | Nielsen | 395/325 |
| 5,151,994 | 9/1992 | Wille et al. | 395/800 |

FOREIGN PATENT DOCUMENTS

| | | | |
|---|---|---|---|
| 8500304 | 6/1986 | Australia | H04L 11/16 |
| 0115883 | 8/1984 | European Pat. Off. | G06F 13/37 |
| 0202485 | 11/1986 | European Pat. Off. | G06F 13/37 |
| 0175095 | 3/1988 | European Pat. Off. | G06F 13/37 |
| 0271582 | 6/1988 | European Pat. Off. | G06F 13/26 |

OTHER PUBLICATIONS

"Mechanism for Implementing Preemptive Priorities in Dual Bus Networks", IBM Technical Disclosure Bulletin, vol. 33, No. 9, Feb. 1991, pp. 102–106.

Primary Examiner—Gopal C. Ray
Attorney, Agent, or Firm—Ware, Fressola, Van Der Sluys & Adolphson

[57] ABSTRACT

The access control arrangement controls access to communication channel of a plurality of interconnected units each of which has an own priority assigned to it. Each unit receives from a preceding unit an access request word comprising a plurality of successive request channels to which priorities are assigned and writes its own priority in the corresponding request channel. The request word is then transmitted to a following unit. When preceding unit has a priority exceeding the priority of the considered unit, these preceding units are inhibited from accessing the communication channel. When after a predetermined time interval, the considered unit is not inhibited by any of the following units, it may access the communication channel.

9 Claims, 4 Drawing Sheets

PRIORITY BASED ACCESS CONTROL ARRANGEMENT

TECHNICAL FIELD

The present invention relates to an access control arrangement to control access to a communication channel of a plurality of interconnected units each of which has an own priority assigned to it.

BACKGROUND OF THE INVENTION

Such an arrangement is already known in the art, e.g. from the published International Patent Application PCT/AU85/00304. Therein the communication channel comprises two oppositely directed unidirectional busses to both of which the units are connected. The latter units each include two queues of data packets to be transmitted over a respective bus: e.g. packets of a first queue are transmitted over a first bus and packets of a second queue are transmitted over a second bus. The latter packets include the access request word and a busy field. When upon receipt of the access request word, e.g. on the first bus, a unit wants to transmit a packet of the second queue, it registers its own priority in the request word by marking the assigned channel thereof provided that this channel is free. If not, the unit waits for the next access request word. Each unit includes a counter which is incremented by one for each priority, marked in the passing access request words and which is higher than its own priority. The counter is decremented by one for each data packet passing on the second bus and having a not activated busy field, i.e. the data packet is empty. When the latter counter has a zero value at the moment an empty packet passes on the second bus, the unit may access the bus and use the latter packet to store data in it. In this way access to the communication channel by a unit is inhibited as long as the data packets passing by are not empty and as long as the latter unit's counter has not reached the zero value.

Due to the presence of the dual bus and the counters, the known access control arrangement is of a rather complicated structure.

DISCLOSURE OF INVENTION

An object of the invention is to provide an access control arrangement of the above type, but which is of a simpler structure and operation.

According to the present invention, request channels are assigned to said priorities in increasing order when considered from a preceding to a following unit, and that said unit further includes word processing means operating said inhibiting means upon detecting that said own priority is not smaller than a highest priority stored in said request word.

Since the request channels are assigned in increasing order, i.e. the channel with highest priority is received first by the receiving means of a unit, the access request word can be processed on a channel by channel basis. Indeed, when a unit wanting to access the communication channel, receives a request channel for which the assigned priority corresponds to its own priority, whilst none of the previous request channels was marked, then it knows that no previous unit has a higher priority and it may operate the inhibiting means by, for instance, activating a control signal on a control line interconnecting the units. When a marked request channel is received before the unit was able to mark a request channel, then a previous unit has a higher priority and the unit may not access the communication channel. Therefore a unit can consider a request channel upon receipt thereof and does not have to process the request word as a whole.

A unit which has inhibited the previous units and is not inhibited by any of the following ones knows that it has the highest priority and that it is allowed to access to the communication channel. In this way there is no need for the earlier mentioned counters and for the dual bus. Moreover, due to the channel by channel processing, the handling and interpretation of the access request word is simpler than in the known arrangement.

Consequently the new access control arrangement is of a less complicated structure than the known one and simpler in operation.

Another characteristic feature of the invention is that said access request word is transmitted on its own.

Since in the known arrangement the access request word is part of a data packet, the latter arrangement has to include means for extraction of the access request word from the data packet.

On the contrary, in the present arrangement the access request word is transmitted on its own, as a result of which the complexity of the structure of the arrangement is even more reduced since the latter extraction means are not needed.

An advantage of the present access control arrangement is that the configuration of the units needing access to the communication channel may be adapted in a flexible way. A unit can be added anywhere on tile bus provided that its priority is suitably chosen based on its access requirements. For example, a unit needing access whenever it has to transmit a data packet may be inserted anywhere on the channel provided it has a higher priority than the existing units.

Moreover removal from or addition of a unit on the channel has no impact on the access control mechanism.

The above mentioned and other objects and features of the invention will become more apparent and the invention itself will be best understood by referring to the following description of an embodiment taken in conjunction with the accompanying drawings.

BEST MODE FOR CARRYING OUT THE INVENTION

Figure 1:
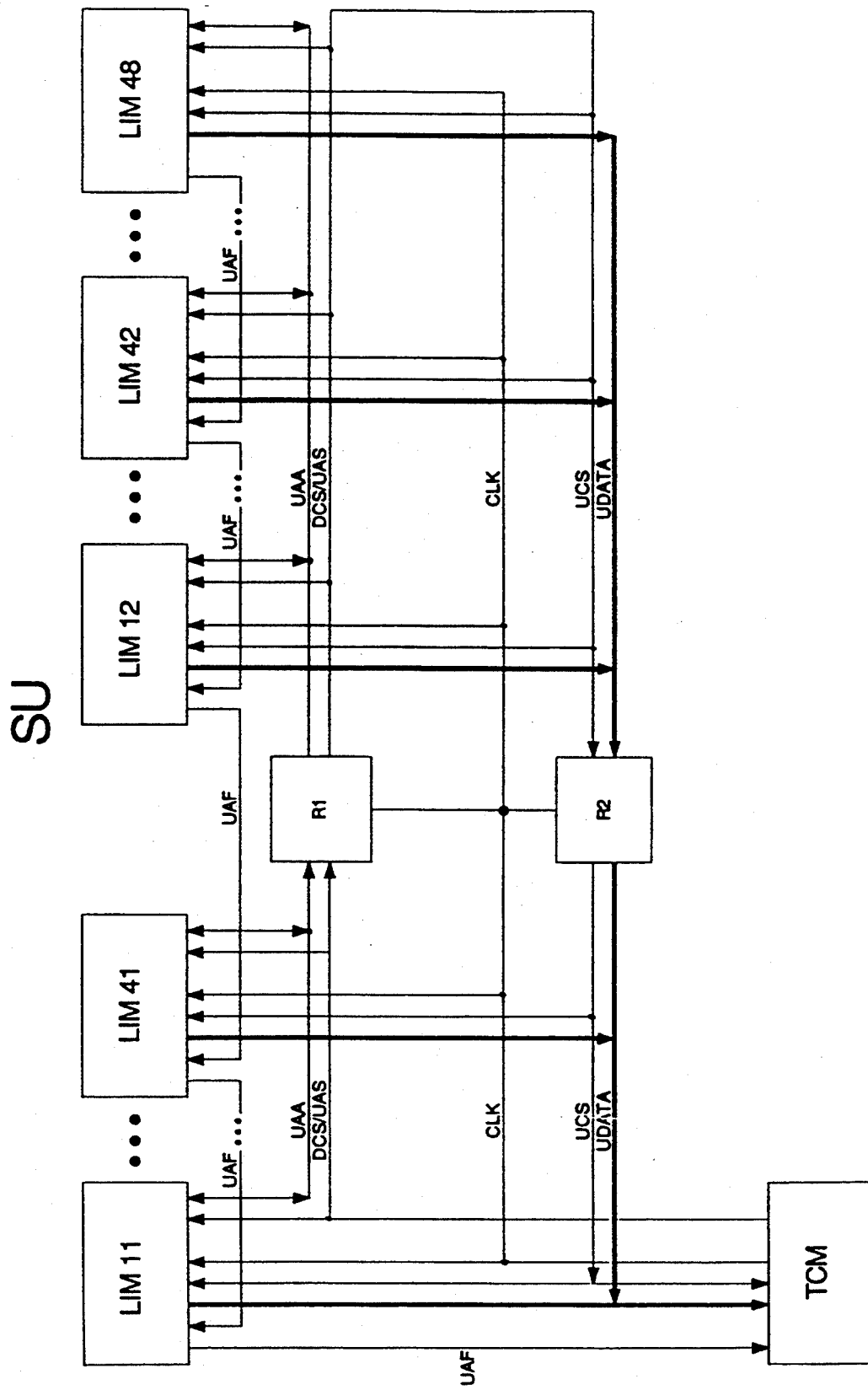
FIG. 1 is a schematic representation of a subscriber unit (SU) including an access control arrangement according to the invention.

Referring to FIG. 1 the subscriber unit SU schematically represented therein is coupled to a not shown Asynchronous Transfer Mode Passive Optical Network (APON) over which asynchronous transfer mode (ATM) cells are transmitted. It includes a Terminal Control Module TCN and up to 32 units, more specifically Line Interface Modules, LIM11 to LIM48, grouped in 8 sets of 4 units, LIM11 to LIM41, LIM12 to LIMA2, ... , LIM18 to LIM48. These line interface modules LIM11 to LIM48 each constitute an interface between the subscriber unit SU and external units (not shown), such as telephone sets, computers, telefax machines and so on. The terminal control module TCM controls the interworking of the subscriber unit SU and the APON network.

To be noted that the line interface modules LIM11 to LIM48 are grouped in 8 sets of 4 modules located on a backplane module (not shown) because this grouping facilitates the extendibility and the timing of the subscriber unit.

The line interface modules LIM11 to LIM48 are connected to the terminal control module TCM by a common interface. This interface includes a communication channel UDATA used to transfer a signal UDATA comprising the ATM cells from the line interface modules LIM11 to LIM48 to the Terminal Control Module TCM, via which they access the APON network. The common interface also includes an access control interface DCS/UAS, UCS, UAA, UAF used to control access of the line interface modules to the communication channel UDATA based on e.g. 16 priorities assigned to the 32 interface modules.

The communication channel UDATA is constituted by an 8-bit parallel bus controlled by TCM and which for simplicity is represented in FIG. 1 by a single line UDATA to which TCM and all line interface modules LIM11 to LIM48 are connected, LIM11 being located nearest to TCM and LIM68 at the tail of the bus.

The access control interface comprises five control lines DCS/UAS, UCS, CLK, UAA and UAF and access control of the line interface modules to UDATA is realized using control signals DCS/UAS, UCS, CLK, UAA and UAF which are applied to the like-named control lines to which LIM11 to LIM48 and TCM are connected in the same way as just described above in relation with UDATA.

The signal DCS/UAS is an Access Start signal indicating to each line interface module the start of the access control phase, as will be explained later. This signal is generated by TCM under control of a scheduling signal sent to it by a main station (not shown) included in the APON network.

The lines DCS/UAS and UCS are interconnected in an open two-branch loop, each branch being coupled to all line interface modules and, for the DCS/UAS line, starting at TCM and ending at LIM48. Therefore the signal UCS is the signal DCS/UAS returning after having been received by all line interface modules LIM11 to LIM48.

The signal CLK is a clock signal generated by the terminal control module TCM and has a frequency corresponding to the byte rate of the transmitted ATM cells, whilst UAA, which is a wired AND line, and UAF are an Access Arbitration signal and an Access Flag signal respectively, both generated by the line interface modules during the access control phase. The functionality of these signals will be explained later.

The above mentioned control signals, except UAF, are retimed from one unit to another in registers, only the registers R1 and R2 located between the first set, LIM11 to LIM41, and the second set, LIM12 to LIM42 being represented in FIG. 1. The signals DCS/UAS and UAA are retimed in R1 by the clock signal CLK, whilst UCS and UDATA are retimed in R2 by the same clock signal CLK.

It is to be noted that the line UAF is not a continuous line to which the line interface modules have access. There is however a buffering of this signal on a LIM basis, such that when a LIM is not equipped or extracted, the UAF signal is propagated to the preceding LIM or TCM. UAF interconnects the latter modules as shown in FIG. 1 for LIM41 and LIM12. Each module namely has an output port connected to an input port of the preceding module via the line UAF. The signal UAF transmitted on these lines is processed internally in the modules and consequently for a module the signal UAF generated at the above output port is not necessarily the same as the signal UAF received at the mentioned input port. For simplicity of FIG. 1 the incoming and outgoing signal have both been named UAF.

Figure 3:
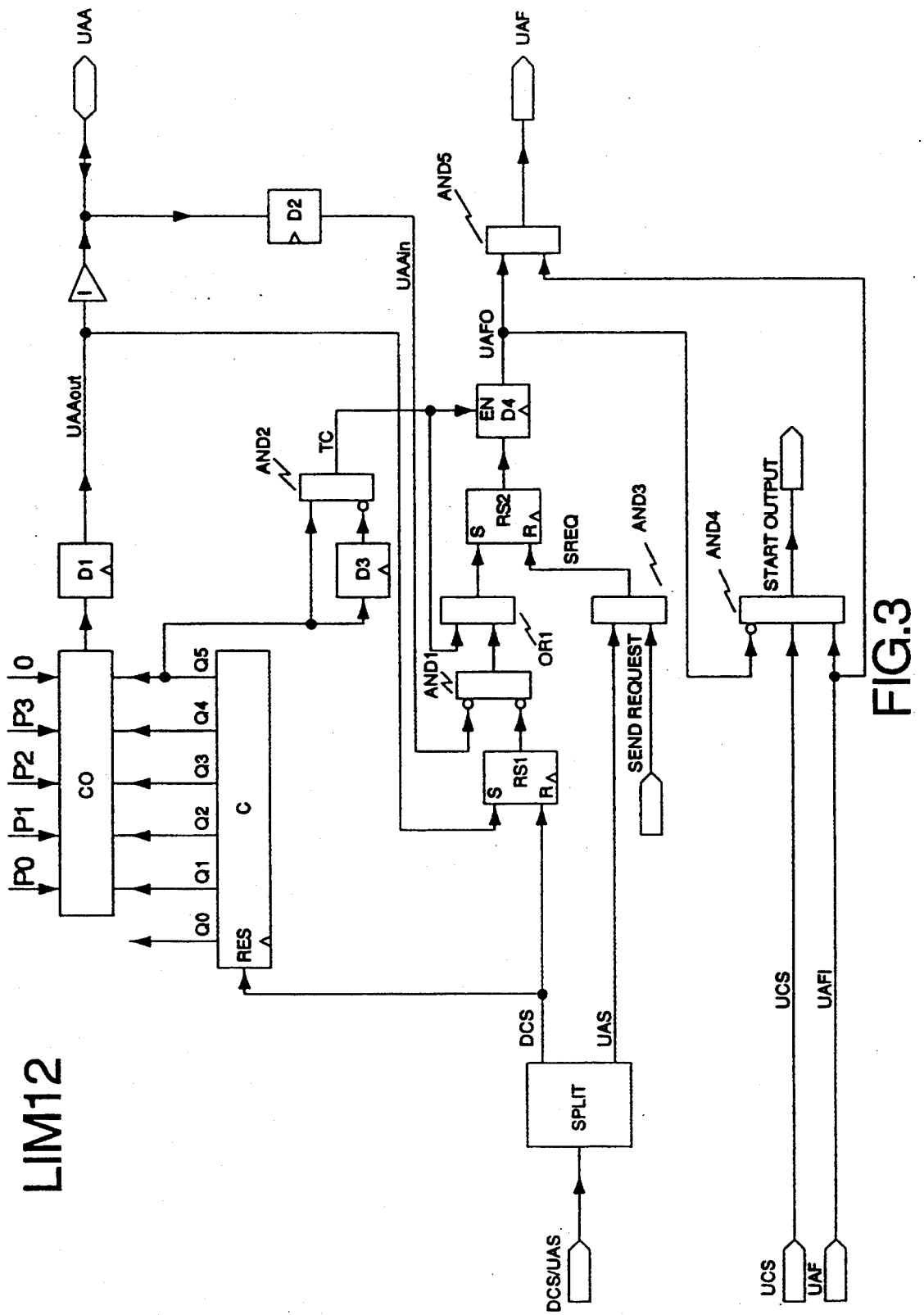
FIG. 3 is a detailed functional diagram of LIM12 of FIG. 1.

However, in FIG. 3, which shows LIM12 in more detail, the incoming signal UAF is called UAFI, whilst the generated signal is called UAFO.

Figure 2:
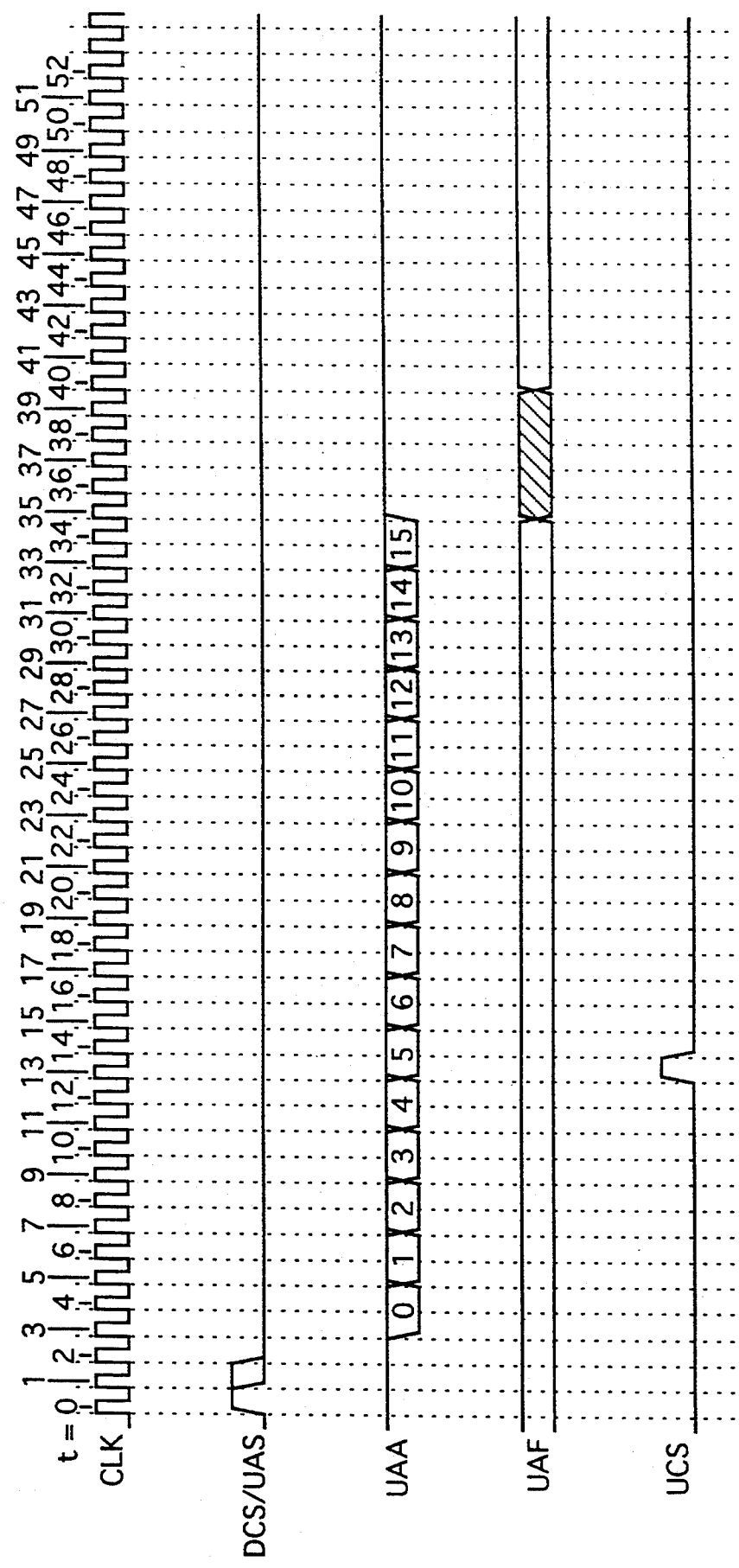
FIG. 2 shows a timing diagram of control signals used by the access control arrangement of FIG. 1.

FIG. 2 shows waveform on a common timeline representative of the control signals CLK, DCS/UAS, UAA, UAF, UCS as seen by the second set of line interface modules, i.e. LIM12 to LIM42. Since the signals DC/UAS, UAA and UCS are retimed only between the consecutive sets, all interface modules of one set, at a predetermined instant, see the same value of these signals.

Reference is now made to FIG. 1 and FIG. 2 for a description of the principle of operation of the access control arrangement i.e. a description of how the set of interface modules LIM12 to LIM42 gain access to the communication channel UDATA under the control of this access arrangement. Although this description is made for LIM12 to LIM42 it is equally applicable to the other control sets of SU.

It has to be noted that in order to simplify the description delay times required for the stabilization of the control signals as well as hardware reaction delays have not been taken into account.

After receipt of the start signal DCS/UAS the line interface modules LIM12 to LIM42 start reading the signal UAA which is constituted by an access request word with 16 request channels, each of which is 2 clock pulses long. Both DCS/UAS and UAA are received from the preceding set, LIM11 to LIM14, via R1. The request channels each have an assigned priority, and are therefore from now on called priority channels, and are received by each terminal unit in decreasing order of priority. This means that priority channel 0 first received in a module has the highest priority e.g. priority 0 whereas the last channel 15 received has the lowest priority e.g. 15. Since all priority channels of the access request word are equally long, i.e. 2 clock pulses, and since the beginning of the access request word is indicated by the receipt of the signal DCS/UAS, the position of the priority channels and therefore also their corresponding priorities is determined by the time interval elapsed since the receipt of DCS/UAS.

An interface module wanting to access the communication bus, reads the content of the priority channels during tile second hair thereof, i.e. during its second clock pulse, to detect the access priorities of the preceding modules, and marks a channel during the first half thereof, i.e. during its first clock pulse, provided that the priority assigned to the latter channel equals the module's own priority.

Following is a more detailed description of the above read/write phase by means of two examples.

In a first example a module with priority 3 wants to access the communication channel, whilst one of the preceding modules has a higher priority, e.g. 2.

After receipt of the DCS/UAS signal the module starts reading the arriving channels. During the second half of channels 0 and 1, no marked channel are read. However when reading channel 2, at the second clock pulse thereof, a marked channel is detected and the module therefore stops reading the channels and waits until the next DC/UAS signal is received to restart its reading action.

In the next example it is supposed that none of the preceding modules has a higher priority than the priority, e.g. 2, of the module waiting to access the communication channel.

After receipt of the DCS/UAS signal, the module again starts reading the arriving channels and detects that channels 0 and 1 are not marked. It then marks channel 2 during its first clock pulse to indicate its priority to the following modules, and prevents the preceding modules from accessing the communication channel as will be explained later. At that instant the module knows that its priority is higher than the priorities of the preceding modules or equal to at least one of them, but it knows nothing about the priorities of the following modules. As a result, when all sets of line interface modules have received the access request word only the modules having a priority which is not exceeded by the priority of any of the preceding modules remain on the communication channel.

A module having a priority not exceeded by the priorities of the preceding modules may inhibit the latter modules from the moment the access request word is passed from the set to which the module belongs to a following set. However, the inhibition has to be performed before a following access control phase starts, i.e. before the end of the 53th clock pulse after receipt of the start signal DCS/UAS. An ATM cell being 53 bytes long and one byte being transmitted during one clock pulse as mentioned earlier whilst a cell may be sent over UDATA within each access request phase.

To inhibit the preceding modules, a module generates a low signal UAF.

The signal UAF generated by the last module LIM48 needs a predetermined time interval to reach the first module LIM11. As can be seen in FIG. 2 UAF however always reaches LIM11 before the signal UCS of the next access control phase, because on the one hand UAF is generated by LIM48 before the signal DCS/UAS of the next cycle is returned as UCS and on the other hand UAF is only delayed by its transmission delay on the line UAF whilst UCS is delayed by the regenerating registers. For this reason the line interface modules read the value of the received signal UAF upon receipt of the signal UCS belonging to the next access control phase.

In this way, a module can detect whether a following module has a priority higher than or equal to its own priority, in which case it withdraws from the communication channel UDATA.

It has to be noted that in practice the signal UAF is activated by the line interface modules at least a predetermined time interval before the end of an access control phase to be sure that at the receipt of the signal UCS in the next cycle, UAF can be read as a stable signal by all modules.

In the considered embodiment the priority assigned to each of the line interface modules is fixed. This priority could however be made dynamically adaptable.

The line interface module LIN12 is shown in detail in FIG. 5. It includes for realization of the access control mechanism a splitting circuitry to split the signal DCS/UAS which consists of 2 consecutive high pulses, each one clock cycle long, in two separate consecutive signals DCS and UAS, a 6-bit counter C which is reset by applying the signal DCS at its reset input RES and which has outputs Q0 to Q5 of which Q1 to Q5 are connected to respective first inputs of a 5 bit comparator CO, Q0 not being used. The priority code of LIM12 is applied to 4 second inputs P0 to P5 of CO, whilst a 5th input is kept at a logical 0 value. An output of the comparator CO is coupled to the line UAA via the series connection of a first D flipflop D1 and an inverter I. A signal UAAout generated at the output of D1 is applied not only to the input of the inverter I, but also to an input S of an RS-flipflop RS1, whilst the signal DCS is applied to another input R thereof. A signal generated at an output of RS1 is applied to a first inverting input of an AND gate AND1 whilst an output signal of the invertor I is applied to an inverting second input of AND1 via a D-flipflop D2. The signal applied at the latter second input is called UAAin and is the signal seen by LIM12 on the line UAA.

A signal generated at the output Q5 of the counter C is applied to a first input of an AND gate AND2 and to an input of a D-flipflop D5 an output of which is connected to an inverting input of AND2. A signal TC generated at an output of AND2 is applied to a first input of an QR gate DR1 whilst a signal generated by AND1 is applied to the second input thereof.

The signal UAS is applied to an input of an AND gate AND3 whilst a signal SEND REQUEST internally generated by LIM12 when an ATN cell is queued for transmission, is applied to a second input thereof. AND3 generates a signal SREQ which is applied to an input R of an RS-flipflop RS2 to another input S of which an output signal of OR1 is fed.

An output of RS2 is coupled to a first input of an AND-gate AND5 via a D-flipflop D4. The signal generated at the output of the latter D-flipflop is the earlier mentioned UAFO signal, i.e. the signal UAF generated by LIM12, and is applied at an inverting input of an AND gate AND4, the signals UCS and UAFI which is the earlier mentioned incoming signal UAF, being applied to a second and third input of AND4 which generates a signal START OUTPUT for internal usage in LIM12.

UAFO and UAFI are applied to respective inputs of an AND gate AND5 at an output of which the signal UAF is generated which is transmitted to the preceding line interface module.

It has to be noted that the counter C and all flipflops are controlled by the clock signal CLK. For the sake of clarity this is however not shown in FIG. 3.

Figure 4:
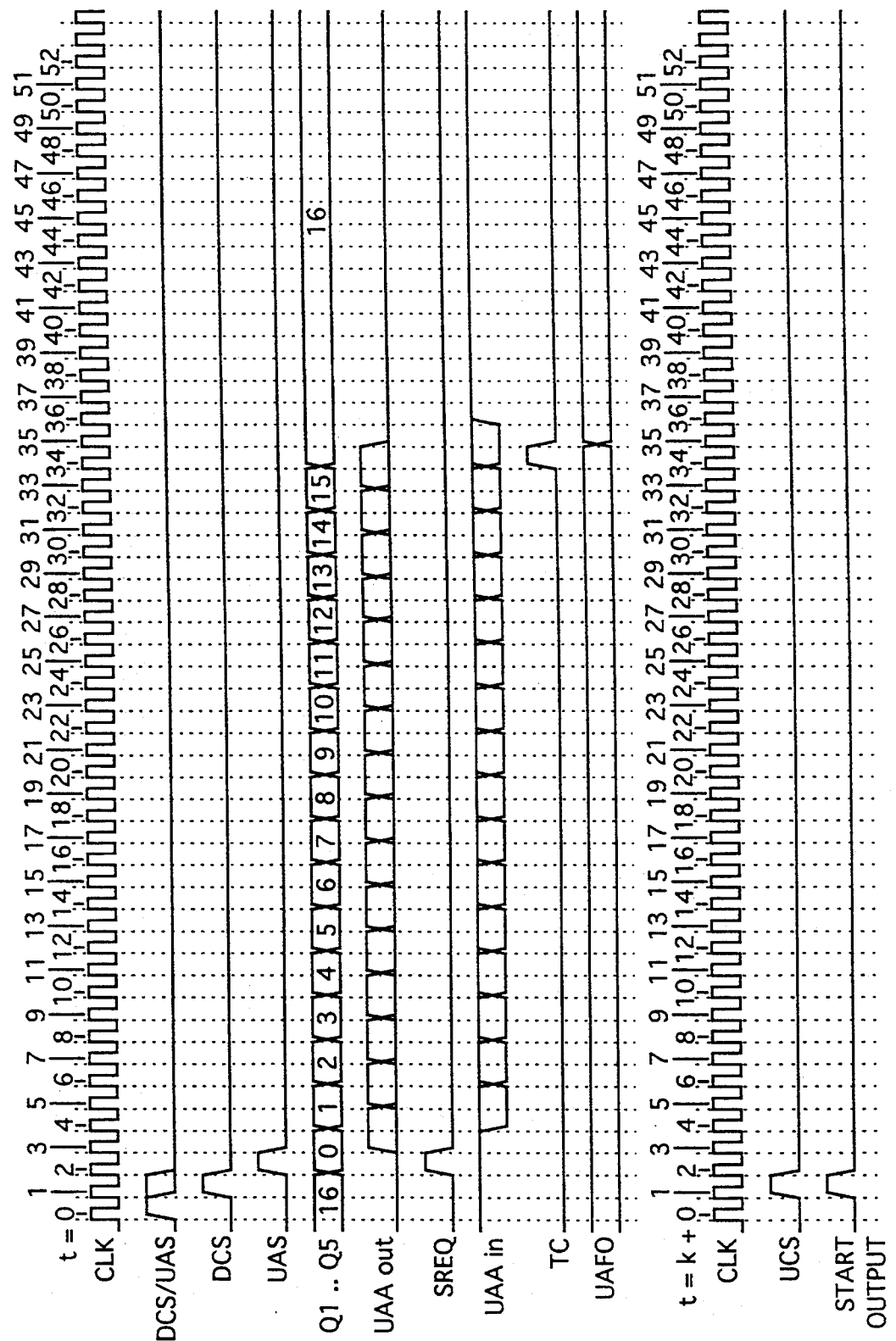
FIG. 4 represents a time diagram of various signals used and generated by LIM12 of FIG. 3.

Following is, with reference to FIG. 3 and to FIG. 4 which represents a timing diagram of signals used and generated by the circuit of FIG. 3, a description of the working of LIM12 with respect to the access control mechanism. This description is applicable to all line interface modules and is based on the earlier given example of a module, e.g. LIM12, having priority 3 and wanting to access the communication channel whilst a preceding module has priority 2 and of the same module having priority 2 which is not exceeded by the priority of any of the preceding modules.

As soon as a high signal DCS has reset the counter C, the latter starts counting at the rate of clock CLK. The priority of LIN12 being equal to three, a high signal will appear at the output of the comparator CO at the sixth clock pulse after the reset of C, since at that moment 01 to Q5 generate a digital 00011 signal which lasts 2 clock periods. Since however UAA becomes low at the third clock pulse, because of the priority 2 of a preceding module UAAin becomes low at the fourth clock pulse and UAAin is consequently low before UAAout goes high. As a result the output signal of RS1 which has been reset by the signal DCS, is still low the moment the low signal UAAin is applied to AND1. As a consequence AND1 generates a high output signal which is applied to the input S of RS2 via OR1. RS2 was reset via AND3, by the signal UAS since the internal signal SEND REQUEST is high because a cell has to be transmitted by LIM12, and application of the high signal at the input S of RS2 causes a high output signal thereof. The moment TC goes high, i.e. one clock pulse after Q5 goes high D4 is enabled and UAFO goes high. UAF is consequently determined by the value of UAFI, which means that the preceding modules are not inhibited by LIM12. The latter modules will be inhibited when UAFI goes low for LIM12, thus realizing via AND5 a low signal UAF.

UAFO being high, the signal START OUTPUT is low and access to the communication channel which is triggered internally in LIM12 by the latter signal, is inhibited.

To be noted that UAAout going high after UAAin went low, does not change the high value of the signal applied to D4, and consequently has no influence on the value of UAFO, because RS2 was already set by the low signal UAAin and has not been reset in the meantime.

Supposing on the contrary that the priority of LIM12 is 2 and is not exceeded by the priority of a preceding module, UAAout goes high before UAAin goes low, i.e. 4 clock pulses after the reset of C. This causes a high output of RS1 and a low output of AND1. Consequently the output of OR1 remains low until TC goes high, at which moment D4 is enabled thereby generating a low signal UAFO, and thus via AND5 a low signal UAF for tile preceding modules which are thus inhibited as will be explained hereafter.

It has to be noted, that even if UAAin goes low after UAAout went high, the output of AND1 remains low because of the high output signal of RS1 and consequently the output signal of RS2 remains low.

UAFO being low, the value of the signal START OUTPUT at the moment UCS goes high is determined by the incoming signal UAF, i.e. UAFI. Indeed, if UAFI is ION, meaning that the priority of LIM12 is not higher than the priority of the following terminals then START OUTPUT stays low and LIM12 does not access UDATA. If on the contrary UAFI is high, LIM12 has the highest priority and it accesses UDATA since START OUTPUT is high.

It has to be noted that additional circuitry could be foreseen to disable D1 when a low UAAin signal is received before UAAout goes high thereby prohibiting UAAout from being put on the line UAA.

As mentioned earlier the priority code applied to the inputs P0 to P3 of CO can be fixed or variable.

While the principles of the invention have been described above in connection with specific apparatus, it is to be clearly understood that this description is made only by way of example and not as a limitation on the scope of the invention.

We claim:

1. Access control apparatus to control access to a communication channel of a plurality of interconnected units each one of which has an own unit priority assigned to it and includes:

a receiving means to receive from a preceding unit an access request word comprising a plurality of successive request channels to which channel priorities are assigned;

a writing means for writing an access request in the request channel whose channel priority corresponds to its own unit priority 1 and for transmitting the access request word to a following unit;

an inhibiting means for inhibiting access of preceding units to said communication channel, wherein said channel priorities are assigned to said request channels in such a way that they are received in decreasing order by said one unit, and wherein said one unit further includes word processing means for operating said inhibiting means when during the processing of said received access request word it is detected that said own priority is not lesser than any unit priority already written in said received access request word; and detection means to detect, a predetermined interval after transmission of said access request word by a last one of said units, whether a following unit has operated its inhibiting means, in which case said one unit may not access said communication channel.

2. Access control apparatus according to claim 1, wherein said writing means writes an access request in said access request channel when said own unit priority is not lesser than said any unit priority already written in said received access request word.

3. Access control apparatus according to claim 1, wherein each of said units includes a second inhibiting means to inhibit access of said unit to said communication channel when said own priority is lesser than said any unit priority already written in said received access request word.

4. Access control apparatus according to claim 1, wherein said access request word is transmitted by itself.

5. Access control apparatus according to claim 1, wherein said inhibit means applies an active control signal to a control line interconnecting said units for inhibiting access to the communications channel of units of lesser unit priority.

6. Access control apparatus according to claim 5, wherein said active control signal is applied a selected time interval after transmission by said unit of said request word.

7. Access control apparatus according to claim 1, wherein said apparatus additionally includes a control line interconnecting said units and a control module which provides a start signal on said control line, a beginning of said access request word being indicated to said units by receipt of said start signal.

8. Access control apparatus according to claim 7, wherein for each unit, a corresponding position of each of said successive request channels in said access request word is determined by a selected time interval elapsed since said receipt by said unit of said start signal.

9. Access control apparatus according to claim 1, wherein said unit priority is variable.

* * * * *

UNITED STATES PATENT AND TRADEMARK OFFICE
CERTIFICATE OF CORRECTION

PATENT NO. : 5,434,984
DATED : July 18, 1995
INVENTOR(S) : Deloddere et al.

It is certified that error appears in the above-indentified patent and that said Letters Patent is hereby corrected as shown below:

Item [57] Abstract, line 9, "When preceding" should read "When no preceding", insert —no—

Claim 1, col. 8, line 12 delete "1" and insert ",".

Signed and Sealed this

Seventh Day of November, 1995

*Attest:*

BRUCE LEHMAN

*Attesting Officer*    *Commissioner of Patents and Trademarks*